United States Patent [19]

Seaman et al.

[11] Patent Number: 5,414,644
[45] Date of Patent: May 9, 1995

[54] REPETITIVE EVENT ANALYSIS SYSTEM

[75] Inventors: Gary W. Seaman, Pasadena; Michael Mascha, Los Angeles, both of Calif.; Homer F. Williams, New York, N.Y.

[73] Assignee: Ethnographics, Inc., Pasadena, Calif.

[21] Appl. No.: 158,010

[22] Filed: Nov. 24, 1993

[51] Int. Cl.$^6$ ............................................. G06F 15/401
[52] U.S. Cl. ........................... 364/551.01; 364/225.4; 364/419.11; 395/600; 395/156; 369/48; 369/49
[58] Field of Search .................... 364/551.01, 419.11, 364/419.13, 225.4; 395/600, 159; 382/56; 369/48, 49

[56] References Cited

U.S. PATENT DOCUMENTS

| | | | |
|---|---|---|---|
| 4,587,635 | 5/1986 | Hashimoto et al. | |
| 4,685,001 | 8/1987 | Martin. | |
| 4,717,971 | 1/1988 | Sawyer. | |
| 4,729,043 | 3/1988 | Worth. | |
| 4,757,302 | 7/1988 | Hatakeyama et al. | |
| 4,758,955 | 7/1988 | Chen. | |
| 4,774,596 | 9/1988 | Hashimoto. | |
| 4,779,080 | 10/1988 | Coughlin et al. | |
| 4,814,972 | 3/1989 | Winter et al. | |
| 4,817,036 | 3/1989 | Millet et al. | 395/600 |
| 4,829,169 | 5/1989 | Watanabe. | |
| 4,831,610 | 5/1989 | Hoda et al. | |
| 5,062,060 | 10/1991 | Kolnick | 395/159 |
| 5,072,412 | 12/1991 | Henderson, Jr. et al. | 395/159 |
| 5,165,103 | 11/1992 | Takeda et al. | 382/56 |
| 5,202,828 | 4/1993 | Vertelney et al. | 364/419.13 |
| 5,241,671 | 8/1993 | Reed et al. | 395/600 |
| 5,265,065 | 11/1993 | Turtle | 395/600 |
| 5,265,242 | 11/1993 | Fujisawa et al. | 395/600 |
| 5,265,244 | 11/1993 | Ghosh et al. | 395/600 |
| 5,276,616 | 1/1994 | Kuga et al. | 364/419.11 |
| 5,276,870 | 1/1994 | Shan et al. | 395/600 |

FOREIGN PATENT DOCUMENTS

| | | |
|---|---|---|
| 172357 | 2/1986 | European Pat. Off. |
| 272158 | 6/1988 | European Pat. Off. |

OTHER PUBLICATIONS

Aigrain, "Organizing Image Banks for Visual Access: Model and Techniques", Optica 87. Proceedings of the International Meetings for Optical Publishing and Storages, pp. 257–270, Apr. 14–16, 1987.

Barney, "Getting It All on Disc", CD ROM Review, Oct. 1986, pp. 26–27.

Batley, "Visual Retrieval: Browsing Strategies in Pictorial Databases", vol. 1, Online 88 Information. 12th International Online Information Meeting, Dec. 6–8, 1988, pp. 373–382.

Cohen et al., "Video Disc Dictionary System", IBM Technical Disclosure Bulletin, vol. 25, No. 8, pp. 4209, Jan. 1983.

(List continued on next page.)

Primary Examiner—Emanuel T. Voeltz
Assistant Examiner—Alan Tran

[57] ABSTRACT

A method of observing and comparing the visual record of repetitive or related events in nature, such as behavioral activities, recorded on a viewable media, which includes converting the visual record into a digital format, storing the digital record in a database at an identifiable location, establishing and storing a textual database comprising written descriptions of the visual record and a glossary of key words identifying repetitive events, the stored information constituting an information library. The library is stored in a microprocessor system, the microprocessor being programmed so that a user can search and retrieve multiple images of a selected event, precursor visual images of events prior to the event in time, responsive activity showing events subsequent to the selected event and contemporaneous events, all retrieved visual images including textual information. The method includes the ability of the user to update, reorder, supplement, and expand the information library as desired.

28 Claims, 3 Drawing Sheets

FOREIGN PATENT DOCUMENTS

Crawford et al., "Toward the Development of Interfaces for Untrained Users", vol. 22, Proceedings of the Forty-eight American Society for Information Science (ASIS) Annual Meeting, 1985, pp. 236–239.

Dureau et al., "Videralp, An Optical Analog Disk Planned in the Rhone Alpes Region", Optica 87, Proceedings of the Inter-national Meeting for Optical Publishing and Storage, Apr. 14–16, 1987, pp. 249–256.

Field, "Where the Heck Am I", InCider, Oct. 1989, pp. 48–53.

Lewis, "Planetarium on a Screen", The New York Times, Tuesday, Sep. 12, 1989. I.

McGlynn, "Connecting an Optical Disc Archive with a Relational Data Base Catalogue".

McGraw Hill CD-ROM (an advertisement letter and flyer).

O'Connor, "Integrating Optical VideoDisc and CD/ROM Technology to Teach Art History", J. Eductional Technology Systems, vol. ~7(1), pp. 27–32, 1988-89.

Schaefer et al., "CD-ROM Arrives in the Library: Powerful, J. Databases Marketed", Information Retrieval & Library Automation, vol. 21, No. 10, Mar. 1986, pp. 1–5.

Veith, "Information Retrieval and Spatial Orientation", ASIS Proceedings 1985, pp. 205–254.

REPETITIVE EVENT ANALYSIS SYSTEM

BACKGROUND

The present invention relates to techniques to evaluate behavior so that causes and/or intentionality (purpose) of time based events or acts can be identified; learned behavior can be analyzed; and responsive conduct can be predicted.

In the past, investigators desiring to study learning, behavior or stimulus/response interplay had to spend years observing activities of the subject and related subjects. Even when timebased video tapes, movies, audio tapes and notes were extensively compiled, it was virtually impossible to identify and analyze similar behavior in an efficient, scientific, and methodical manner. Additionally, since different researchers may perceive the same act in the same species or organism in a different light, their different methodologies made it difficult to establish a consistent basis for comparison. Thus, the majority of behavioral studies were anecdotal and were not amenable to statistical analysis or even side by side comparison.

Systems have been developed for indexing single sets of information and retrieving information, whether textual or visual, for viewing. However, these systems have been designed simply to read and observe the information and possibly append related information. For example, material presented in books, encyclopedias, magazines, catalogs, etc. and related visual information (i.e., still or moving pictures) can be stored on digital recording media or in a computer memory. This information can then be accessed interactively, i.e. simultaneously presented on both audio and visual equipment. Prior art systems, such as the Grolier CD-ROM based encyclopedia, had limited access to various types of information. The Grolier CD-ROM allowed access to textual information but did not have the capability of storing and accessing pictures or sound. Other systems, such as the World GeoGrahics software, a graphics based atlas, allowed access to visual images but only provided access to textual material directly connected to the graphic image selected. U.S. Pat. No. 5,241,671, issued Aug. 31, 1993 to Reed et al, which is incorporated herein by reference, discloses a multimedia search system using a plurality of entry path means to retrieve similarly coded textual and graphical information stored in a data base so that the information located in different data bases can be simultaneously presented by different media modes. However, neither Reed et al. nor the other prior disclosed systems disclose or suggest that they can be used for comparing, analyzing, or predicting repetitive behavior in a life form.

Thus there is a need for a system which will allow a researcher to readily access information regarding repetitive behavior of life forms contained in voluminous multimedia information databases for comparison. There is also a need for researchers to simultaneously observe precursor and responsive behavior in the same subject performing the same or similar activity over a period of time. There is still a further need to be able to readily observe, compare and analyze different subjects or different species showing similar behavior in the same or disparate environments.

SUMMARY

These needs are met by the present invention which comprises a method of storing and retrieving textual and time based graphic information regarding repetitive behavioral activities and displaying that information so that similar acts or developmental stages can be visualized and compared and precursor events and responsive acts can be analyzed. This allows behavior or cognitive processes to be understood and quantified and performance and responses to be predicted.

DRAWINGS

These and other features, aspects and advantages of the present invention will become better understood with reference to the following description, appended claims, and accompanying drawings, where:

DESCRIPTION

A system which incorporates features of the present invention includes graphic information (still and motion images) stored in an accessible medium, such as a CD-ROM, laser disc, video file server, or information accessible via a connection, such as a video ethernet or other data delivery network, or any other recording medium that can be computer controlled.

There was no suggestion in the prior art systems that labeled and indexed visual information regarding life forms or living species could be used for comparing acts of the form or species recorded at different times, with different subjects and by different observers to determine cause/effect relationships and/or identify learned behavior or cognitive processes. This capability is enhanced by the ability of the system user to access textual information related to the images, textual information describing similar behavior, or textual information appended by the user or other observers of the displayed image to reach a hypothesis regarding the observed behavior. Further, the system gives the media observer the ability to access old information in a new manner and to arrive at new conclusions. Because of the manner of storage and ease of complete retrieval, hypotheses arrived at can then be supported by a statistical analysis or directly observed representations rather than just anecdotally supported conclusions.

The technique of the present invention is distinguishable from prior art indexing systems in that the prior systems were used merely to locate and display discrete instances of behavior or information and not behavioral events in the context where they occurred. As such there was no need or suggestion that these prior systems were applicable to observed behavior or that they could be used to analyze or compare cause and effect, behavior or cognitive processes in related situations by contextualized information from related time based events.

Systems incorporating the invention can utilize any technique of storage of audio/visual information whereby specific events can be cataloged, and all audio/visual information similarly cataloged can be readily accessed and retrieved. It is preferred to convert audio/visual information originally recorded in an analog form into a digital format such as CD-ROM. However, other readily accessible storage media for audio/visual information, such as hard drives, video tape, magnetooptical drives, laser disks, magnetic tape or any other means of storing digitized audio/visual media can be utilized in conjunction with computerized controls. Also, any means of accessing such information, such as a cable, network or a video ethernet can be utilized.

The system is designed to operate on any computer system, such as an Apple Macintosh, Amiga, IBM PC, Sun Workstation, or any other computerized system having an adequate memory, an audio/visual display, and a two way interface with the stored audio/visual information. This system can also work on a TV top system or any system with a means for storing, displaying and searching video, sound and text or any other sensory information. A particular preferred system comprises an Apple Macintosh Model II having at least 4 Megs of memory, a 20 Meg hard drive, a running System 7, Hypercard software utilizing the Quicktime driver, a mouse and keyboard and a color monitor with a resolution of 640 by 480 able to display text, play sound and display video clips, and a CD-ROM drive (or a laser disk) able to deliver text and video clips. A more preferred system can include a higher resolution monitor, a faster CD-ROM drive, a larger hard drive and more memory.

While prior art systems are primarily adapted for use as a multimedia encyclopedia database and search system, the present system is specifically designed for identifying, labeling, and comparing events recorded with a time based code as they occur and in their original context, particularly events which involve life forms or living subjects, so that the recorded event can be compared or contrasted with similar events involving the same living subject recorded at a different time or similar events involving different live subjects in the same or different locales or environments, whether recorded by the same or different observers.

Also, non-time dependent information as well as visual and textual records can be given a sequence, rerecorded with a time code and then appended to the time based records. Thus, these non-time dependent events and visual records can be merged into a time-based system and retrieved, searched and viewed in the same manner that a time based record can be retrieved, searched and viewed. Such a system allows for one consistent access mechanism and thus simplifies the retrieval of dissimilar and separate information. This logic also can be extended to other sensory input such as sound, speech and smell, which would allow access to any stored information as a type of multi-sensory movie or a time-slice from any sequence. While technology to store and retrieve smells, taste and tactile sensations are presently not available, the systems incorporating the invention would be applicable to identifying, labeling and comparing the sensory outputs once the technology is developed.

Moreover, the technique permits the automatic splicing of time-slices so that an appropriately scientific presentation can be made from the provided information. This presentation could show the clips in the requested sequence, including voice and text annotations and background sounds of the subject presented.

For descriptive purposes, the life form under observation is referred to as "the subject." To utilize the system a glossary is established by assigning a key word or phrase to each behavioral archetype. The key word is then elaborated both verbally and by a representative series of images showing the behavior. Each living subject is identified by name and image; and if the subject is part of a community under observation, then a genealogical chart and relationships within the community or other network of association is defined. In addition, a chronological time base is established for each subject as well as the community at large which can be linked to world or solar time. A detailed log is then made of the recorded field observations, identifying each recorded event using the glossary with the event being referenced to the particular subject, the subject's chronological history, and the chronology of the community or network under observation. Additionally, each image or time segment of video within the activity, as well as each activity having an assigned key word or phrase, is identified by a location in the time based data archive. A second textual data base is established which includes any written records of events transcribed contemporaneously with the audio/visual record, as well as any later recorded analysis or comparison, these transcribed records being likewise keyed to the subject, chronological time and the time based image location in the graphic database. In this manner, any specific activity and the context of that activity, including prior (a precursor event) or following (responsive) events or contemporaneous event or activities as well as any textual or graphical information related thereto, no matter how voluminous the data base, can be observed and compared with any other similar activity (i.g., EKG output, weather patterns, time of day, etc.) Likewise, where a particular precursor event is believed to cause the activity under study, all instances of the same type of precursor event can be readily accessed and represented in some media form to confirm or disprove the incidence of the cause/effect relationship. The recording, labelling and categorization of particular repetitive behaviors can then be analyzed in a methodical and scientific manner and statistically analyzed. Until now, it was often necessary to wade through hours of video records to locate one telling moment. As a result, a researcher trying to analyze and compare video records of repetitive behavior usually found the task to be so time consuming as to prohibit a thorough and comprehensive scientific analysis.

The utility of the system is best illustrated by specific examples. Jane Goodall spent 32 years observing chimpanzees in their natural habitat. Over the course of those years she collected one of the most comprehensive records of animal behavior ever compiled, consisting of over five hundred hours of film and video taped records of the chimpanzee community at Gombe, Tanzania along with voluminous field notes, maps and photographs. A portion of this information has been transferred to a CD-ROM, laser disk or other digitized storage medium and the remainder is in the process of being transferred. A text-and-video glossary of 333 basic activities or behaviors has been established. Added to this was an identification of 150 chimps in the Gombe community along with the relationship of each chimp in the community (parentage, position in the hierarchy) and typical behaviors. It was then possible, for example, to view the life of a particular chimp as well as its family. By entering in the name of a particular chimp, Fifi for example, and moving the cursor along Fifi's life line, the whole recorded life of the chimp from infancy to old age can be viewed without confusion with other subjects. This reveals the developmental trajectory of Fifi over her life and allows the researcher to see how much Fifi learned about a certain activity and what the learning apparati were. The operator also learns that Flo is Fifi's mother and Frodo is an offspring of Fifi. A characteristic activity of the chosen chimp can then be observed, such as "stone throwing", and that activity can be observed from its earliest incidence to a later modified stage or a still further evolution of the activity.

In this manner, the use of some tools may be observed from its earliest discovery by a single animal, along with any instances of use by the animal being observed by others or learning the act. Evolution of a learned activity can thus be observed using this technique. In a specific example, chimps have learned to use sticks to pick up insects crawling on land. By observing this behavior over a period of time it was discovered that the chimp transferred this learning by attempting to adapt the behavior to other environments, such as attempting to use a stick to pick up water bugs in a stream bed.

While researchers in the past observing video recordings of similar acts occurring at different times have reached the conclusion that a dominant chimp actually communicated by soft vocalization and eye contact to formulate a course of action against strangers to the community, this conclusion would be easier to reach and more statistically based or confidently framed by using a system incorporating the invention.

Using the system, activities of separate communities of similar species, such as other chimpanzee communities, can also be compared for similarities and differences. In this way, the chimps living in a natural environment can be compared with chimps in captivity, allowing the enrichment of the environment of the captive chimps by providing a more natural living experience. Further, by comparing the behavior of primates in captivity to that of humans in an enclosed setting, such as in an institution, prison or nursing home, similar psychopathic behaviors can be discovered.

Figure 2:
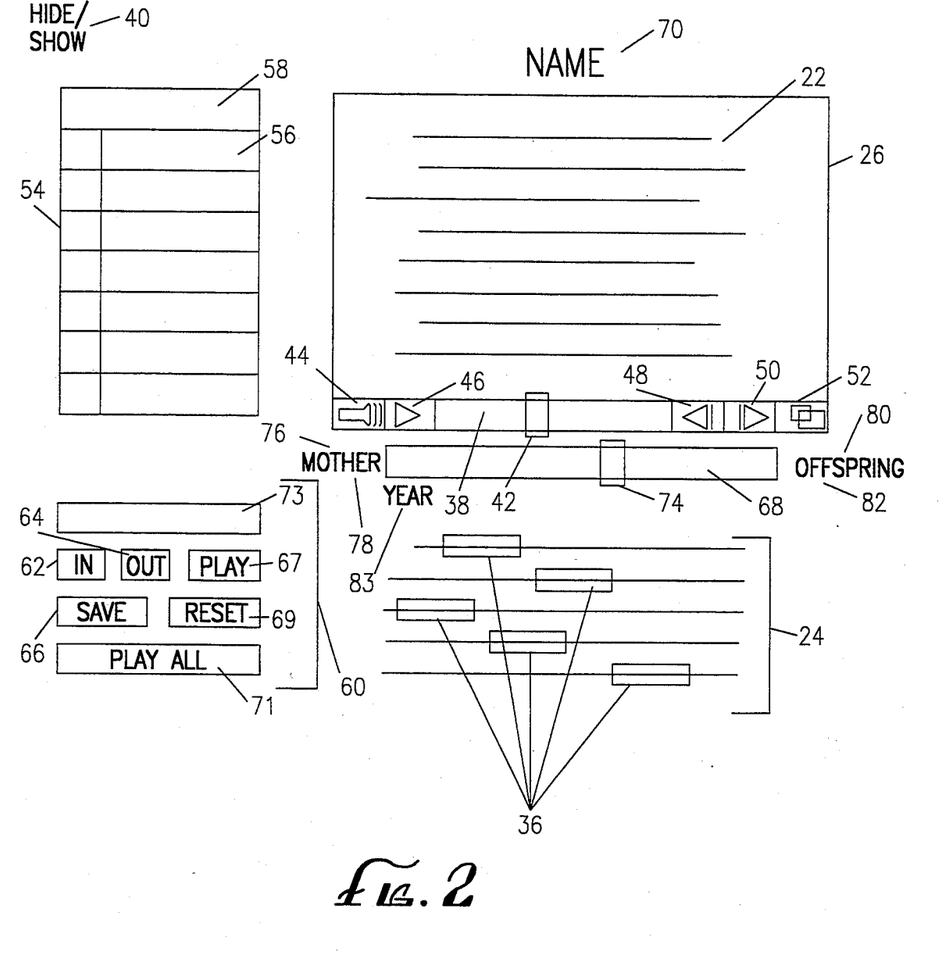
FIG. 2 shows the Subject/Genealogical access screen.
Figure 3:
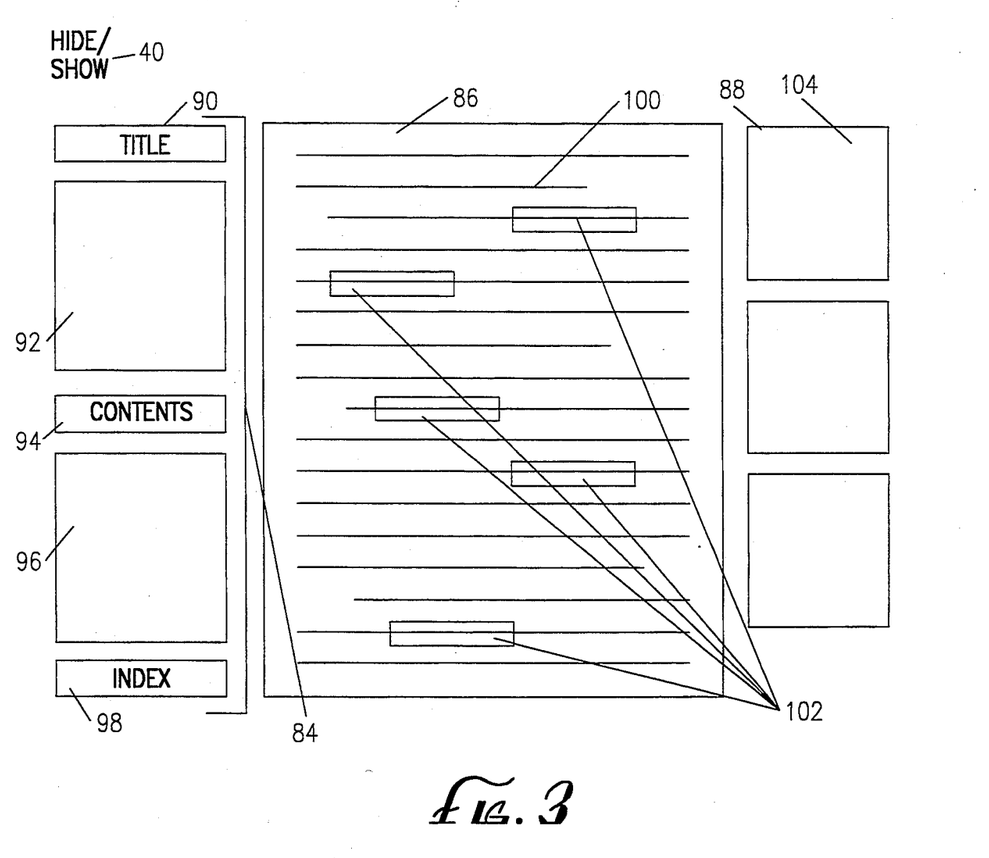
FIG. 3 shows the Library screen.

A preferred embodiment of the system has three methods of accessing the information with each method having a screen view associated therewith. The Activity/Behavior screen is shown in FIG. 2, the Biographical screen is shown in FIG. 3 and the Library screen is shown in FIG. 4. The discussion below uses a standard mouse to activate (click on) a screen toggle or move (drag) an image to a new location. Every screen has a return button 18 which allows the user to switch to the previously viewed screen type.

Activity/Behavior Screen

The Activity/Behavior screen (FIG. 1) allows access to similar behaviors and precursors and responsive behaviors, related behaviors of a chosen subject. The behavior keyword 20 identifies what is currently being viewed in the video/list panel 22 and set forth in the descriptive text 24. If at any time the user wishes to switch to a different behavior, clicking on the visible behavior keyword 20 will present in the video/list panel 22 a list of behavior keywords 26 which can be selected. Clicking on this selected keyword 26 will display an appropriate video clip.

Positioned below the video/list panel is a button bar 28 which includes a library button 30, a biography button 32 and a next behavior button 34. Selecting the next behavior button 34 will present a subsequent instance of the current behavior. The keyword 20 identifying the type of behavior graphically displayed is indicated at the top of the screen. For example if 'Play' is the next behavior keyword 20 then the system, organized chronologically, will search for the next time a 'Play' classified behavior occurred and the associated section of the visual image will be displayed. Selecting the biography button 32 will jump the user to the biography screen FIG. 3 and show or indicate the identity of the subject being displayed.

Below the button bar 28 is the descriptive text 24. The descriptive text 24 is a brief textual description of the displayed behavior, related behaviors, the subjects involved and related subjects. Certain words in the descriptive text 24 are highlighted keywords 36 and can be clicked on to access other related behavior or subject biography information. When the highlighted keywords 36 are clicked on the related information and visual displays are made available for viewing.

If the library button 30 is pressed the highlighting on the words disappears and all of the words in the text can act as an index into the library. Therefore, a user can click on any word and this will cause a search serially in the table of contents, index, full text and any other text stored in the data base until a hit or near hit is made (i.e., fuzzy logic). The result of the search will appear on the library screen (FIG. 4), displaying the closest word along with related information or a reference to a book citation. If there is no close word, the actual index is displayed to choose from.

Directly under the video/list panel 22 is the video control bar 38 which is visible only when the hide/show button 40 is pressed. The video control bar 38 is designed to allow slow scrolling, one frame at a time. The video control bar 38 contains five buttons and a placement control/sequential locator 42. The control bar 38 is a visual timeline representation of the entire visual information accessible by the system. On the control bar 38 is a sound on/off toggle button 44, a play button 46, a step back button 48 which also has a slow scan function, a step forward button 50, similarly configured, and a full/small screen toggle button 52. The full/small screen toggle button 52 allows the visual image to fill the entire screen or be shrunk back into its box when selected. Using the placement control/sequential locator 42 any individual frame or frame sequence can be viewed by dragging and dropping the placement control/sequential locator 42 onto the video control bar which will cause the image corresponding to that visual timeline representation to appear. Further, the system allows the viewer to move back through the visual images by a determined amount of time so that the observer can determine when the precursor activity started.

Additionally, when the hide/show button 40 is pressed, a list of sequences or clips 54 displaying the same behavior being observed is shown to the left of the video/list panel 22. The list of clips 54 are actually a set of numbered access points into a continuous visual sequence. Each access item 56 on the list of clips 54 contains information such as an identifying number and set in and out times (indicating at what time in the video sequence to start the play and at what time to finish it). Above the list of clips 54 is a current item identifier 58 which indicates which item is currently viewed in the video/list panel 22.

Create controls 60 is located below the list of clips 54 when the hide/show button is pressed 44. The set of controls 60 are used to create new clips and can potentially allow the inclusion of captions and notes by other observers. Currently the set of controls 60 contains an in-button 62, for allowing the entry of the identity of the start of a selected video sequence, and an out-button 64, for allowing the entry of the identity of the end of the video sequence, and a save button 66 for entering this information into the list of clips 54. Also displayed is a button for controlling the playing 67 of the created clip, the clearing/resetting 69 of the created clip, playing all 71 the clips listed in the list of clips 54 and displaying the current created in and out clip and stopping of the video, the resetting of the image to a chosen location and the deleting of an item from the list of clips 54. Use of video control bar 38 and the functions incorporated therein provide the capability to view and understand the proximate context of the selected time based event.

Biographical Screen

Figure 1:
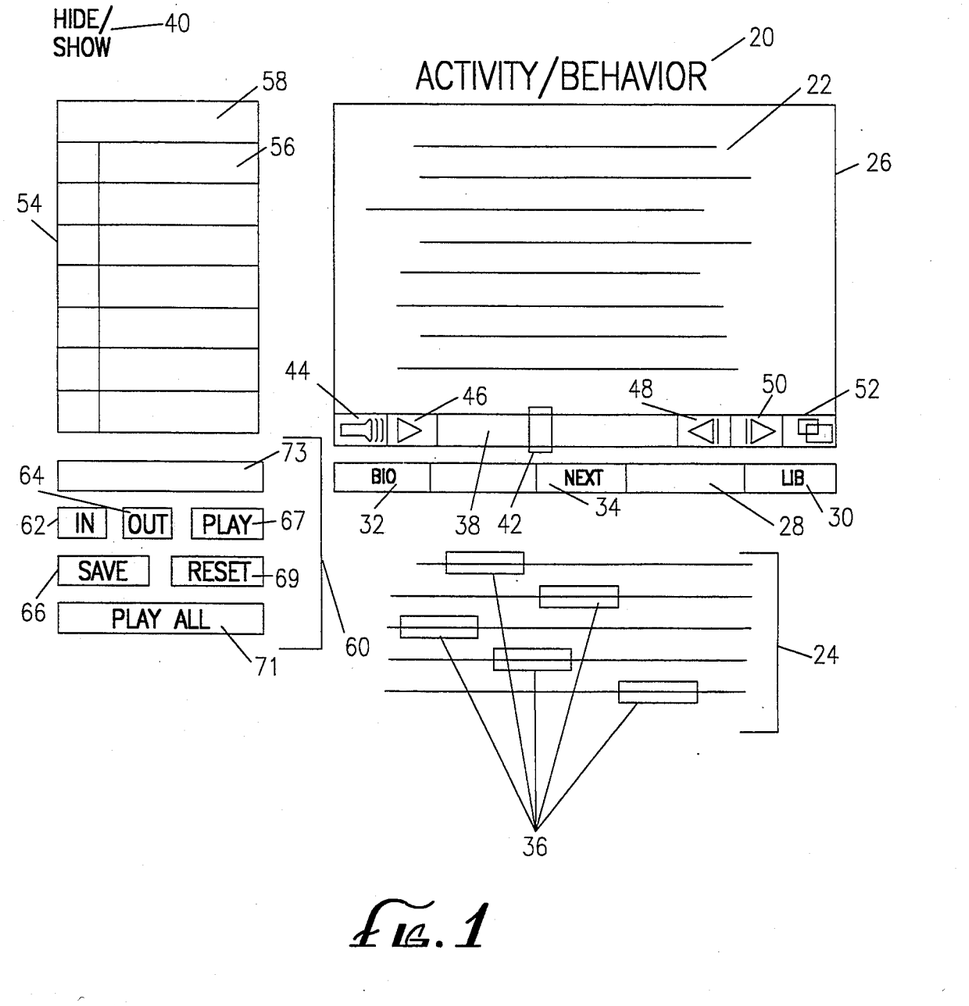
FIG. 1 shows the Activity/Behavioral access screen.

The Biographical screen (FIG. 2) differs only slightly in its format from the Activity/Behavior screen FIG. 1. In this screen, instead of the activity being examined, the subject's parentage, life stages, siblings and offspring are observable. There are two visual changes in the screen format itself. The button bar 32 is replaced by the genealogy bar 68 and the subject name 70 replaces the behavior keyword 20.

The genealogy bar 68 is made up of six main parts, the life stages bar 72, the life stage indicator 74, the parent name 78, and the offspring list 82. The life stage indicator 74 can be positioned along the life stages bar 72 to view a picture of the subject at a certain stage in its life. This can be extended to show a video from one stage of a subject's life to another. If the user points to a first identified area of the screen, the parent indicator 76, the name of the mother 78 will appear in that area and can be chosen. If the mother's name is chosen, then the mother's name is placed in the subject name position 70 and the mother's life stages information is now accessible via the genealogy bar 68. If, instead, the user points to a second identified area 80 of the screen, an offspring list 82 appears in that area which can be selected from and chosen as the next subject.

In either the Activity/Behavior screen or the Biographical screen when the video control bar 38 is visible the visual display can be set for continuous play to allow the entire video recording to be shown. As this is playing the appropriate titles appear for each section of video being displayed. At any time, the user can stop the video and display the appropriate accompanying descriptive text 24.

Library Screen

The Library screen (FIG. 3) allows the user to access the collected information in a booklike form. When a word is chosen from the descriptive text 24 on the Activity/Behavior screen or the Biographical screen (with no keywords 36 highlighted) the Library screen will appear. The Library screen is composed of three areas. On the left is the control area 84; in the center is the viewing area 86; and on the right is the book list 88.

The control area 84 is broken into five control and display items: the title control 90, the book cover display 92, the contents selector 94, the chapters list 96 and the index selector 98. When the control is clicked on, an action is displayed in the viewing area 86. Clicking on the title control 90 will cause the full bibliographical listing of the currently accessed book, including the ISBN number, to appear in the viewing area 86. When the book cover display 92 is clicked, the image of the book cover is shown in the viewing area 86. Clicking the contents selector will cause the entire table of contents of the selected book to appear in the viewing area 86 and allow the selection for display in the viewing area 86 of any portion of the text, such as the appropriate page, to appear in the viewing area 86. Each time a book chapter is accessed and displayed on the library screen, a record is made in the chapter list 96, which will hold up to five chapters, so that each chapter can be easily reaccessed. If the name of a chapter from the chapter list 96 is clicked on, that chapter list 96 then that chapter will appear in the viewing area 86. Selecting the index selector 98 will cause the book's index to appear in the viewing area 86 and allow the selection of a term which will, in turn, cause the appropriate page to appear in the viewing area 86.

The viewing area 86, as described above, allows the selection of particular positions in the book by clicking on an index term or a chapter name. Once text information 100 is visible in the viewing area, 86 the area can be scrolled by simply dragging the pointer in the direction the user wishes to read. For example, to show the lower text the pointer is moved towards the bottom of the viewing area 86 and the text will scroll upwards. The closer the pointer is to the top or bottom of the screen, the faster the text will scroll. Any time actual book text (not index or chapter names) is visible in the viewing area 86, certain preselected words will be highlighted 102. Clicking on highlighted words 102 will cause the screen to change to the appropriate screen; either the Biographical screen or the Activity/Behavior screen, which displays visual images of the subject or behavioral action selected.

The last section of the screen is the book cover display 92 which allows choosing of another book by clicking the picture of the book 104. When a new book is chosen, the text, chapters, index, etc. will be available for the new book and it will automatically connect to the appropriate Biographical and Activity/Behavior screens.

The system has the ability to cross-reference material between any information or media source so that it creates a unique research tool. A researcher can set video bookmarks to return to, or have the potential of choosing, sections of the audio/video record and grabbing or storing it, and playing it at the same time that another audio/video record is being displayed. This gives the researcher the ability to see how behaviors in one group, family, species or environment compare to another. Because of the unique access system, previously dissimilar and separate fields can be compared and new insight can be gained by the comparison.

Another aspect of the system is the ability to add comments, search through the comments, overlay new indexes on the system and add new video records to the information data base. This allows other researchers to view the first researcher's work and comment on their descriptions, add their own descriptions, and choose different video sequences to include in a activity/behavior type. The end result is that the review and analysis of a voluminous record containing textual and graphic images is not limited to one researcher or group of researchers working on a project with one viewpoint. This creates an ultimate compendium of knowledge which can grow with each viewing by another researcher, allowing multiple analyses by different observers using the same set of visual information.

Also, this invention works as an expansive learning tool where a student can access and view the collected works of many researchers with each of their set of ideas. The system permits students to study at a varied pace and see the scientific method in action by viewing the manner in which different scientists comment and append information to their research corpus.

The behavioral analysis system is not limited to chimpanzees but is likewise designed for behavioral analysis of any living form or species. For example, the system can be used to study, evaluate and reach hypotheses regarding the behavior of dolphins in captivity, orangutans in the wild, or human children in a child care setting. It is particularly useful for use in analyzing large inventories of time based media recordings.

Although the present invention has been described in considerable detail with reference to certain preferred versions and uses thereof, other versions and uses are possible. For example, it is not necessary to confine the use of the system to the study of living species. The system is applicable to any time based events involving a species, living subject, organism, life form, living or non-living system, organic or inorganic reactions or physical phenomena such as weather systems, seismic events, or environmental changes. Using the system it should be possible to record complex chemical reactions or physical interactions and then study the impact of different observed variables on the end result. Access to the system can be through voice activated interfaces or other common techniques used to access computer programs and/or systems. Any user can tailor, expand, tag or customize the glossary, edit and reorder the audio/visual output or create a new access screen. Anything created will still interact with the initially present data base in the system. Still further, this system is based on accessing all information via a time based number which allows this system to work with unlimited types of time-relative information. The presentation could be used for any audio/visual media editing, integrated media representations and other presentation formats, and allow the person to add notes as they create the organization by which they want the video to be viewed. Extending this idea, unedited audio/visual media can be distributed, and with this system any individual can create a finished movie from a list of clips.

This system is further extensible by means of an interface in which functionality as well as content is incorporated into timebased media. Single objects (buttons, icons, etc.) are represented by frames in timebased media and are accessed via their identifying frame numbers(s), rather than as discrete objects (buttons, icons, etc.). This extension of the interface allows transitions of apparent objects, represented by frames in timebased media, by advancing the timebase and thus changing the representational forms. Functionality is coordinated and selected by means of synchronized frame addressing within the various timebases of the constituent media. This allows for the consistent accessing of all the controls and therefore streamlines the implementation of the system and allows for even greater flexibility. Also, this permits apparent objects, which means that as one apparent object is acted upon, all screen apparent objects can change in a coordinated manner and any control can be transitioned into any other.

Therefore, the spirit and scope of the appended claims should not be limited to the description of the preferred versions contained herein.

What is claimed is:

1. A method for observing and comparing repetitive behavioral activities during the life span of a life form, said life span being recorded in a series of visual records of the behavioral activities, each visual record of the behavioral activity constituting a segment of the life span, comprising:

a) converting each visual record in the series of visual records into a series of digitized images each digitized image having a location with a specific address and storing a time based identity for each digitized image,
   b) establishing a textual database and storing in the textual data base written descriptions of the digitized images and a glossary of key words describing each behavioral activity exhibited in the digitized image, each key word being associated with at least one exemplary digitized image representative of said key word, each written description being associated with at least one digitized image the digital images, the location of each digitized image the address of each digitized image and the associated written descriptions and key words forming an information library which is stored in a microprocessor system, the microprocessor being programmed so that a user can search and retrieve from the information library,
      1) multiple digitized images of a selected behavioral activity,
      2) precursor digitized images showing precursor behavior occurring at a time prior to each digitized image of the selected behavioral activity,
      3) digitized images showing responsive behavior occurring at a time following each digitized image of the selected behavioral activity, and
      4) digitized images of contemporary events occurring at the same time as the selected behavioral activity,
   such that each retrieved digitized image of selected, precursor, responsive and contemporary behavioral activity can be compared and contrasted.

2. A computer based system to analyze a time based visual record of defined events comprising:
   a) means for storing, in a numerical order, audio/visual information regarding defined events and related textual information,
   b) a plurality of software defined entry paths for searching and retrieving the stored audio/visual information and related textual information including:
      1) a first software defined entry path means for searching and retrieving selected audio/visual information, precursor, audio/visual information, responsive audio/visual information, concurrent audio/visual information, and related textual information regarding a selected event,
      2) a second software defined entry path for searching a glossary of key words and for retrieving, audio/visual information and textual information related thereto,
      3) a third software defined entry path for searching a relationship chart and for retrieving audio/visual images and textual information related thereto, and
      4) a fourth entry path means for searching sequentially through audio/visual records, and
   c) output means for generating a set of displays of the retrieved audio/visual and textual information, whereby the display generated using the entry path allows the analysis, comparison and contrasting of the displayed audio/visual and textual information.

3. A method of analyzing behavior of one or more subjects of a living species comprising the steps of:
   a) collecting audio/visual records illustrating portions of the life of a subject, said portion of the life of the subject including an activity, and optionally, events preceding the activity and events following the activity;

b) creating text describing the audio/visual record of each said portions, activity or events;

c) storing said audio/visual records;

d) indexing said audio/visual records using a sequential coding;

e) associating said text with said audio/visual records;

f) associating said keywords with said audio/visual records;

g) recording said association between said audio/visual records and said text;

h) recording the association between said audio/visual records and keywords;

i) searching said audio/visual records, keywords and text to locate desired visual records;

j) retrieving the audio/visual record, associated keywords and associated text; and k) comparing and contrasting the audio/visual records having the same keywords associated therewith, so that the same event recorded for different subjects can be contrasted and the preceding activity and following activity related thereto can be contrasted.

4. The computer based system of claim 2 wherein the defined activity is a repeated event of a selected subject wherein the subject is chosen from the group consisting of one or more species, living subject, organism, lifeform, living or non-living systems, organic or inorganic reaction and physical phenomena.

5. The computer based system of claim 2 wherein said numerical order can be alternatively chosen from a time based numbering system and a straight sequential numbering system.

6. The computer based system of claim 4 wherein the defined activities are different events related to each other, the relationship being shown on a relationship chart.

7. The computer based system of claim 6 wherein the relationship chart can be changed, amended or deleted.

8. The computer based system of claim 6 wherein the relationship chart is based on genealogical information.

9. The computer based system of claim 2 further having means to access additional records of activities and to add new information relating to the previously collected audio/visual records.

10. The method of claim 3 wherein said audio/visual records, keywords and text are displayed in an observable manner such that one or more audio/visual records, keywords and textual description can be concurrently viewed for one or more subjects and for one or more behaviors.

11. The method of claim 3 wherein said audio/visual records, keywords and text can be modified and supplemented and the associations between the audio/visual records, keywords and text can be changed.

12. The method of claim 10 wherein said displayed audio/visual records, keywords and textual descriptions can be compared, analyzed and contrasted.

13. The method of claim 3 wherein the recorded audio/visual records and associated text include more than one subject and records of similar behaviors of each subject is observable concurrently by selecting a behavior which is common to each subject.

14. The method of claim 13 wherein a subject is chosen from the list consisting of one or more species, living subject, organism, lifeform, living or nonliving systems, organic or inorganic reaction and physical phenomena.

15. The method of claim 1 wherein said audio/visual record is selected from the group consisting of still and motion images, series of images, videotaped records, film, notes, maps, photographs, videoclips, individual video frames and video frame sequences.

16. The method of claim 15 wherein said audio/visual record is delivered from the group of media consisting of CD-ROM, laser disc, video file server, video ethernet and data delivery network.

17. The method of claim 1 wherein the microprocessor is further programmed for creation of a second textual database containing written descriptions of the digitized images and a second glossary of keywords describing selected behavioral activities; whereby each keyword in the second glossary can be different than previously established keywords such that a customized user specific database is established.

18. The method of claim 1 wherein the textual database and written descriptions can be modified and supplemented by a user so that said user can rearrange the visual records and classify the rearranged records with a unique coding selected by the user.

19. The method of claim 1 wherein a user can add new textual input to said textual database.

20. The method of claim 1 wherein a source tag can be assigned to said visual records along with the time based identity to allow a user to view visual records organized alternatively by information source and by said time based identity number.

21. The method of claim 1 further incorporating means to compare behavior activities at different times, different activities at the same time, different views of the same activity, activities concerning different subjects at the same or different activities concerning different subjects at the same time.

22. The method of claim 1 further including the step of displaying a series of visual records relating to a selected behavioral activity beginning at a selected period of time prior to the activity and displaying each successive record related thereto, whereby the visual records are viewed in the same manner as a motion picture.

23. The method of claim 1 wherein textual information regarding an observed incident is viewed.

24. The method of claim 1 wherein information regarding an observed lifeform, the parentage, siblings and offspring of the observed lifeform and descriptive text related thereto can be viewed along with the visual record.

25. The method of claim 1 wherein different visual records showing the same behavior can be viewed.

26. The method of claim 25 wherein each different visual record can be identified by discrete addresses and time based identity within the data base and textual information relating thereto can be displayed.

27. The method of claim 25 wherein each different visual record can be viewed as a collection of screen frames displaying the behavioral activity along with textual descriptions for each sequence.

28. The method of claim 27 wherein the textual descriptions regarding a visual sequence is accessible separate from the visual record.

* * * * *